Figure 1:
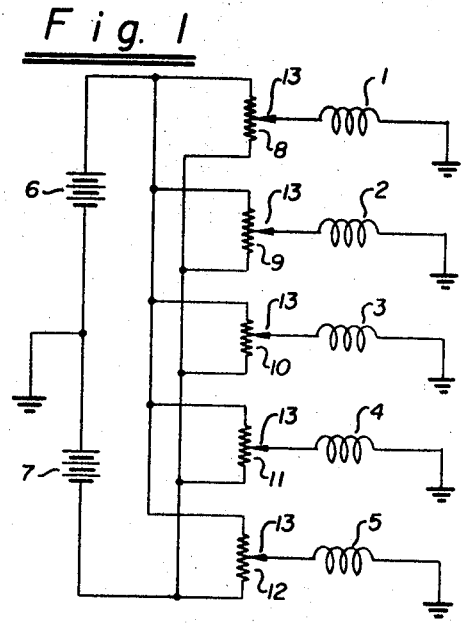

United States Patent [11] 3,582,779

[72] Inventor Arnold L. Bloom
 Menlo Park, Calif.
[21] Appl. No. 525,010
[22] Filed Jan. 20, 1966
[45] Patented June 1, 1971
[73] Assignee Varian Associates
 Palo Alto, Calif.
 Continuation of application Ser. No.
 172,734, Feb. 12, 1962, now abandoned,
 which is a division of application Ser. No.
 797,775, Mar. 6, 1959.

[54] APPARATUS FOR IMPROVING THE HOMOGENEITY OF MAGNETIC FIELDS
 10 Claims, 27 Drawing Figs.
[52] U.S. Cl. .................................................. 324/0.5,
 317/123
[51] Int. Cl. ....................................................... G01n 27/78
[50] Field of Search ............................................ 317/123,
 123 X; 336/225, 230; 324/0.5 MA, 0.5 G, 0.5

[56] References Cited
 UNITED STATES PATENTS
 3,515,979  6/1970  Golay .......................... 324/0.5

Primary Examiner—Michael J. Lynch
Attorney—Vincent W. Cleary

ABSTRACT: Coil configurations for improving the homogeneity of a certain volume of magnetic field by removing certain undesired second order magnetic field gradients including three spaced-apart current loops, each of the current loops being substantially coaxially disposed, a first of the current loops being disposed enveloping centrally the certain volume of magnetic field, the second and third current loops being bucking connected with respect to the first current loop and disposed straddling the certain volume of magnetic field, the second and third current loops have substantially equal turns, and the first current loop has approximately 0.7 times the turns of each of said second and third coils.

PATENTED JUN 1 1971

3,582,779

SHEET 1 OF 5

INVENTORS
Arnold L. Bloom
BY
Attorney

PATENTED JUN 1 1971

3,582,779

SHEET 2 OF 5

INVENTORS
Arnold L. Bloom
BY
Harry E. Aine
Attorney

INVENTORS
Arnold L. Bloom
BY
Attorney

PATENTED JUN 1 1971

3,582,779

INVENTORS
Arnold L. Bloom
BY Harry E. Aine
Attorney

APPARATUS FOR IMPROVING THE HOMOGENEITY OF MAGNETIC FIELDS

The present invention, a continuation of the copending application of Arnold L. Bloom, Ser. No. 172,734, filed Feb. 12, 1962, now abandoned which in turn is a division of copending application Ser. No. 797,775 filed Mar. 6, 1959, relates in general to apparatus for improving the homogeneity of magnetic fields and more specifically, to novel coil configurations for removing substantially all of the first and second order gradients in a given magnetic field.

The present invention is especially useful in the gyromagnetic resonance art and is particularly useful for improving the homogeneity over a sample of matter in which gyromagnetic resonance is being observed either for spectroscopy purposes or for measuring the magnitude of a magnetic field.

Heretofore various schemes have been utilized for removing magnetic field gradients in strong DC magnetic fields utilized for the gyromagnetic resonance art. Some of these devices have included, for example, means for forcibly distorting the yoke of the magnet assembly to produce slight changes in the parallelism of the magnet pole faces thereby serving to alter, in a compensating way, certain of the gradients in the magnetic field. Other devices have included spinners for spinning the gyromagnetic sample within the magnetic field to average out certain of the gradients which produced an undesired resonance line spreading. Recently it has been found that coils disposed at the proper place with respect to the sample and carrying the proper magnitude of electrical current can be utilized to remove certain undesired field gradients.

The present invention provides a plurality of novel coil configurations which may be utilized to remove substantially all of the second order gradients within a given magnetic field. It has been found that all of the first order gradients can be removed by the provision of five sets of independent coil geometries disposed in the manner as taught herein. All of the second order gradients in the magnetic field may be removed using seven sets of independent coil geometries disposed in the manner as taught herein. These coils have been found to be independent such that by varying the current through one of the coil sets, a previous optimized current setting of another set of coils is not thereby altered.

The principle object of the present invention is to provide a novel apparatus for removing substantially all of the second order gradients in a certain volume of magnetic field.

One feature of the present invention is the provision of a set of seven independent coils disposed about the magnetic field within which it is desired to remove the second order gradients and the seven sets of coils adapted to have independent currents applied thereto for removing substantially all of the second order magnetic field gradients within the certain volume of the magnetic field.

Figure 2:
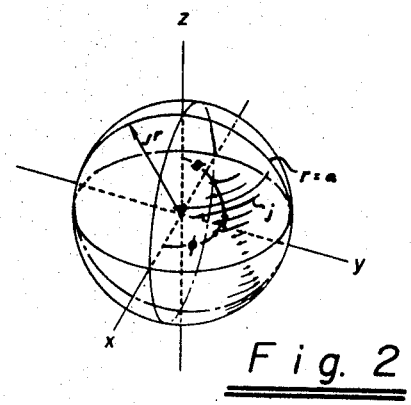
Figure 3:
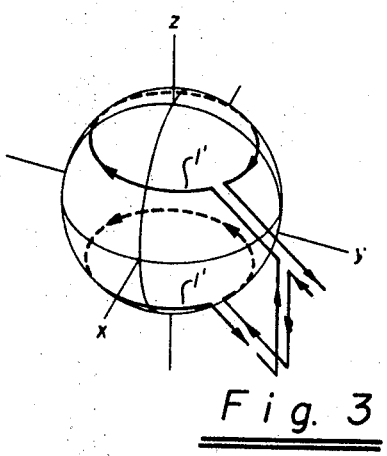
Figure 4:
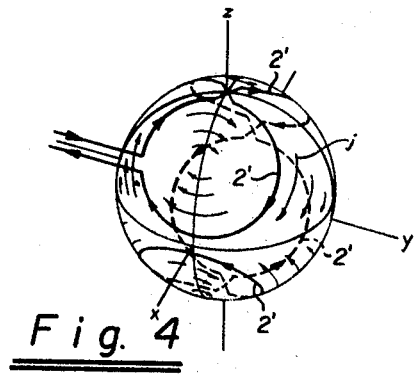
Figure 3A:
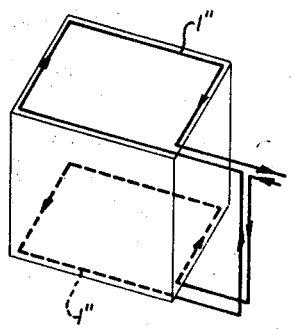
Figure 4A:
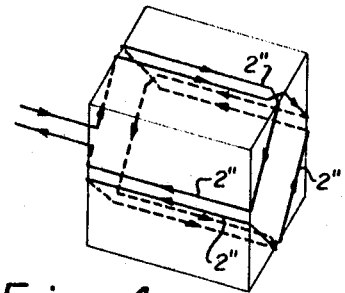
Figure 5:
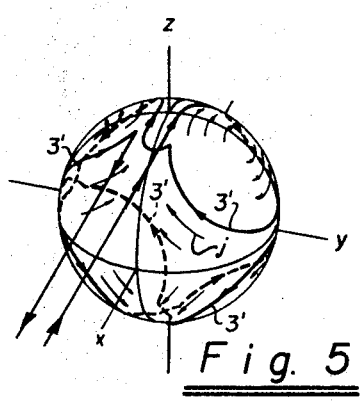
Figure 5A:
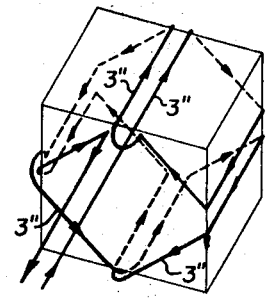
Figure 6:
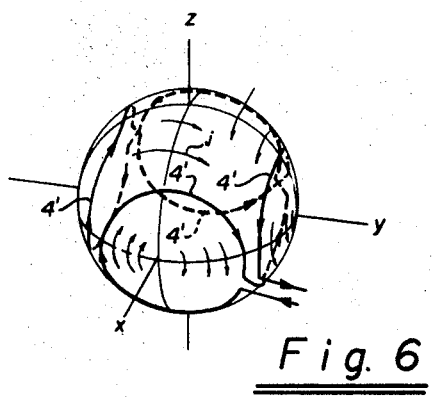
Figure 6A:
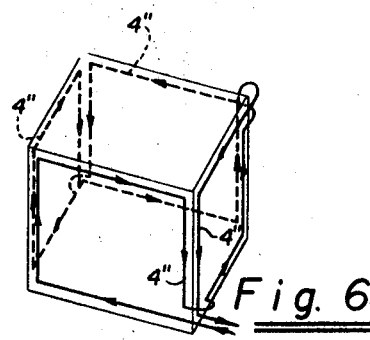
Figure 7:
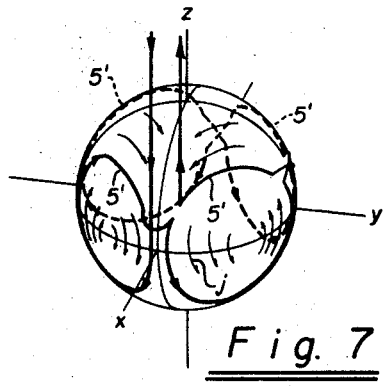
Figure 7A:
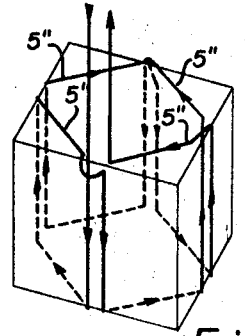
Figure 8:
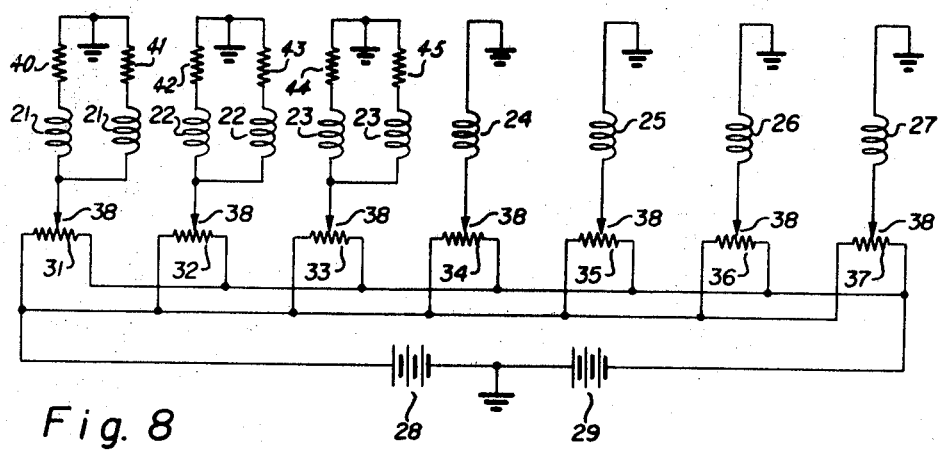
Figure 9:
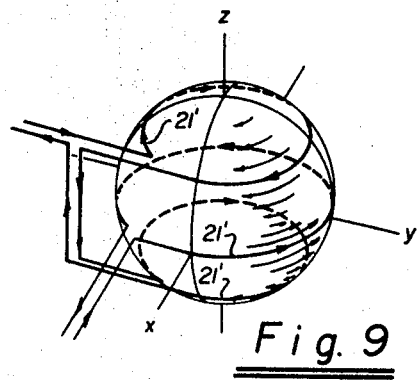
Figure 9A:
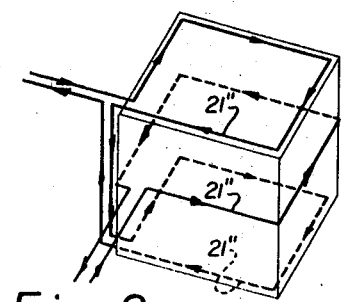
Figure 10:
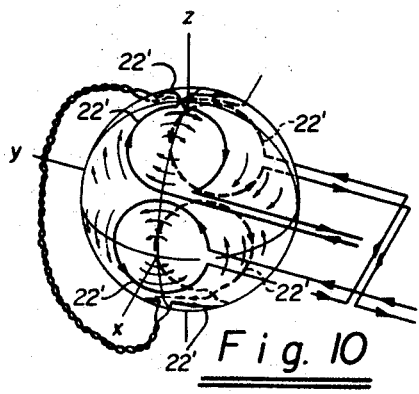
Figure 10A:
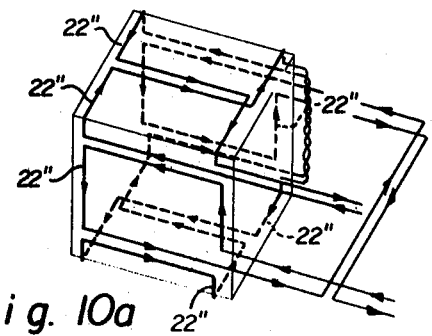

This and other features and advantages of the present invention will become apparent upon a perusal of the specification taken in connection with the accompanying drawings wherein:

FIG. 1 is a schematic circuit diagram of apparatus for removing substantially all the first order gradients in a given magnetic field, FIG. 2 is a drawing of a sphere showing the current distribution thereon for removing certain gradients in the magnetic field at the center thereof, FIG. 3 is a drawing of a sphere having a pair of conducting coils wound on the surface thereof for approximating the current distribution of FIG. 2, FIG. 3A is a cube having a pair of conducting coils wound thereon for approximating the coil configuration of FIG. 3, FIG. 4 is a drawing of a sphere showing the current distribution and coils thereon for independently removing certain gradients of the magnetic field at the center of the sphere, FIG. 4A is a drawing of a cube showing a set of coils wound thereon for removing the same gradients at the center of the cube as are removed by the current distributions of FIG. 4, FIG. 5 is a drawing of a sphere showing the current distributions and coils on the surface thereof for independently removing certain magnetic field gradients at the center thereof, FIG. 5A is a drawing of a cube showing a set of coils for removing the same magnetic field gradients as removed by the current distribution of FIG. 5, FIG. 6 is a drawing of a sphere showing the current distributions and coils thereon for removing a certain set of magnetic field gradients at the center thereof, FIG. 6A is a drawing of a cube showing the set of coils wound thereon for removing the same gradients at the center thereof as are removed by the current distributions of FIG. 6, FIG. 7 is a drawing of a sphere showing the current distribution and coils thereon for removing a certain set of magnetic field gradients at the center thereof, FIG. 7A is a drawing of a cube showing the set of coils wound thereon for removing the same gradients at the center thereof as are removed by the current distributions of FIG. 7, FIG. 8 is a schematic circuit diagram of apparatus for removing substantially all the second order gradients in a given magnetic field, FIG. 9 is a drawing of a sphere showing the current distribution and coils thereon for removing a certain second order gradient in the magnetic field at the center thereof, FIG. 9A is a cube having a set of coils wound thereon for approximating the coil configuration of FIG. 9, FIG. 10 is a drawing of a sphere showing the current distribution and coils thereon for removing a certain second order gradient in the magnetic field at the center thereof, FIG. 10A is a drawing of a cube having a set of coils wound thereon for approximating the coil configuration of FIG. 10.

Figure 11:
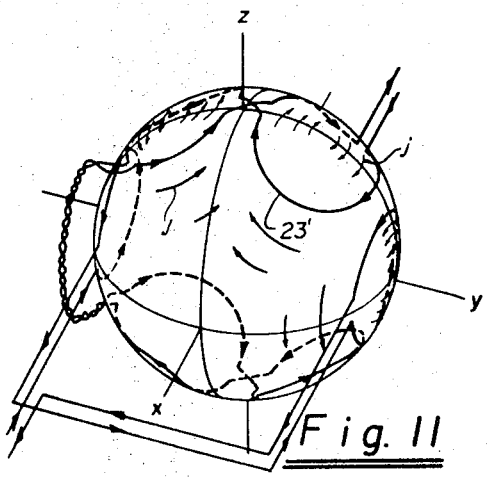
Figure 11A:
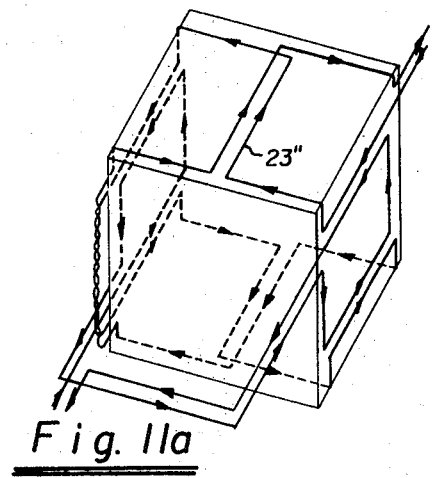
Figure 12:
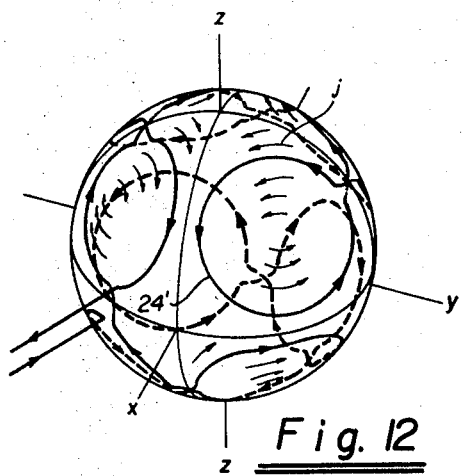
Figure 12A:
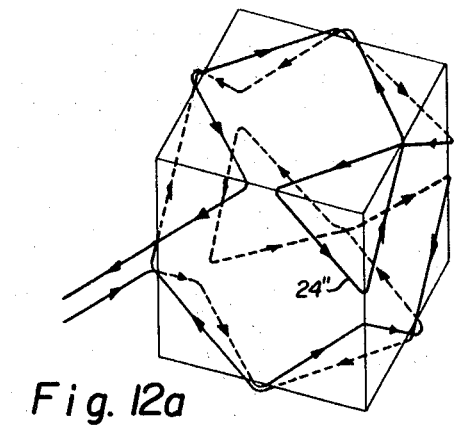
Figure 13:
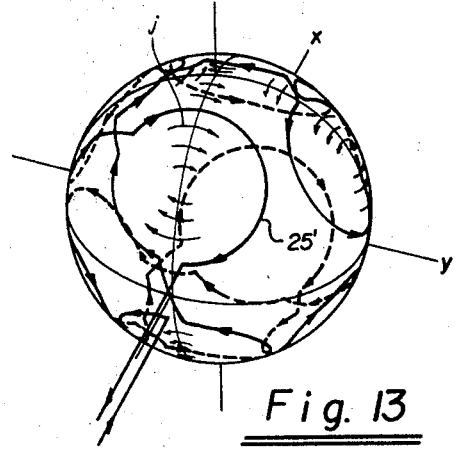
Figure 13A:
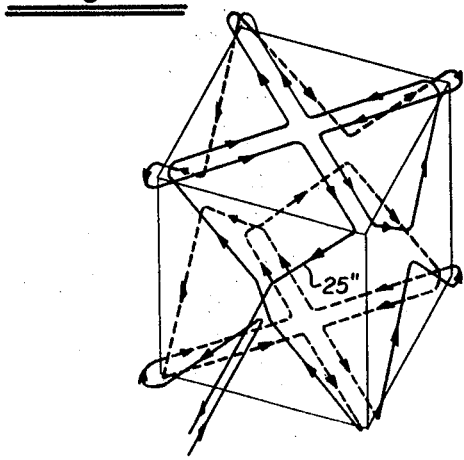
Figure 14:
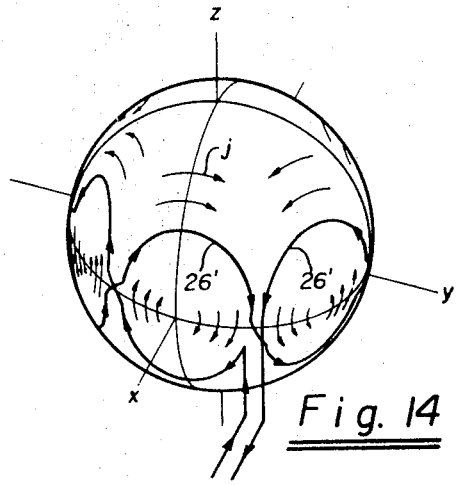
Figure 14A:
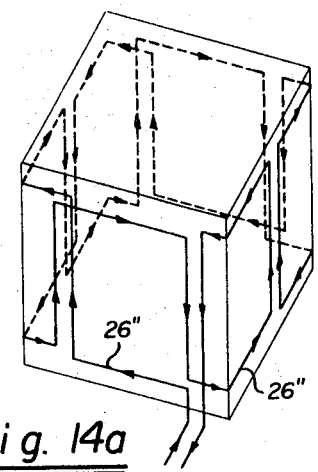
Figure 15:
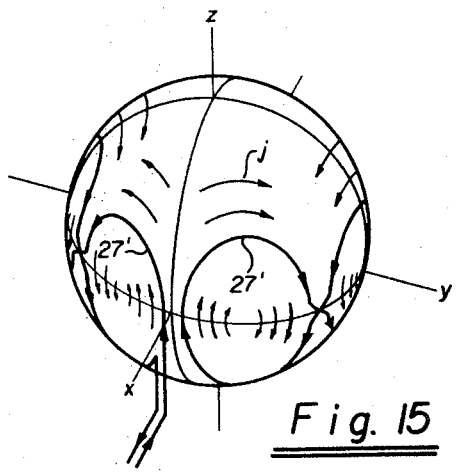
Figure 15A:
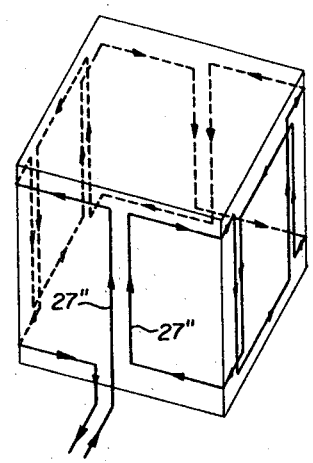

FIG. 11 is a drawing of a sphere showing the current distribution and coils thereon for removing a certain second order gradient in the magnetic field at the center thereof, FIG. 11A is a drawing of a cube showing a set of coils wound thereon for removing the same magnetic field gradients as removed by the current distribution of FIG. 11, FIG. 12 is a drawing of a sphere showing the current distribution and coils thereon for removing a certain second order gradient in the magnetic field at the center thereof, FIG. 12A is a drawing of a cube showing a set of coils wound thereon for removing the gradients removed by the coils of FIG. 12, FIG. 13 is a drawing of a sphere showing the current distribution and coils thereon for removing a certain second order gradient in the magnetic field at the center thereof, FIG. 13A is a drawing of a cube showing a set of coils wound thereon for removing the same gradients as removed by the current distribution of FIG. 13, FIG. 14 is a drawing of a sphere showing the current distribution and coils thereon for removing a certain second order gradient in the magnetic field at the center thereof, FIG. 14A is a drawing of a cube showing a set of coils wound thereon for removing the same gradients as removed by the current distribution of FIG. 14, FIG. 15 is a drawing of a sphere showing the current distribution and coils thereon for removing a certain gradient in the magnetic field at the center thereof, and FIG. 15A is a drawing of a cube showing a set of coils wound thereon for removing the same magnetic field gradients as removed by the current distribution of FIG. 15.

Referring now to FIG. 1 there is shown a schematic circuit diagram of five sets of independent coils utilized for removing all of the first order gradients from the magnetic field at the center of the geometry defined by the sets of coils. MOre specifically, coils 1, 2, 3, 4 and 5 represent the individual independent coil sets, hereinafter described in greater detail. By selecting the proper ampere turns produced by these coil sets substantially all of the first order gradients in the magnetic field, at the center of the spaces defined by said coils 1—5, may be eliminated. The coil sets are energized by independently variable currents derived from batteries 6 and 7 which are connected to make one end of each of the respective resistors 8, 9, 10, 11, and 12 positive and to make the other end of the respective resistors 8, 9, 10, 11 and 12 negative with respect to ground. One end of each of the coil sets 1, 2, 3, 4 and 5 is grounded such that by varying the position of the pickoff 13 on the resistors 8—12, the currents through the coil sets 1—5 may be independently varied in amount and sense as desired.

Referring now to FIG. 2 the solution of the magnetic field problem in terms of current distributions on the surface of a sphere will first be made followed by practical approximations in terms of easily physically realizable coil set configurations for removing substantially all of the first order gradients within a certain volume of magnetic field.

In particular, in a current free region it can be assumed that the magnetic field potential can be defined by Laplace's equation:

$$\vec{B} = -\Delta \psi \quad (1)$$

where $B$ is magnetic field intensity and $\Delta \psi$ is the gradient of the scalar potential magnetic field $\psi$. Solutions of Laplace's equation have the following form for inside and outside of a sphere of radius $a$:

$$\psi_i = (r/a)^n P_{n,m} (A_{n,m} \cos m\Phi + B_{n,m} \sin m\Phi) \quad (2)$$

$$\psi_o = (r/a)^{-(n+1)} P_{n,m} (C_{n,m} \cos m\Phi + D_{n,m} \sin m\Phi) \quad (3)$$

where: $\psi_i$ is the scalar magnetic potential inside of the sphere; $r$ is the distance from the center of the sphere to the point which it is desired to evaluate the scalar potential field $\psi$; $a$ is the radius of the sphere; $P_{n,m}$ is a Legendre Polynomial of degree $n$ and order $m$; $A, B, C$ and $D$ are coefficients; $\Phi$ is the azimuthal angle from the X axis to the point at which it is desired to evaluate the scalar potential; and $\psi_o$ is the scalar potential field outside of the sphere of radius $a$.

By matching a first boundary condition, that the normal component of the magnetic field $B$ is equal just inside and just outside the sphere of radius $a$, we can equate the coefficients $C$ and $D$ with the coefficients $A$ and $B$ as follows:

$$C_{n,m} = A Y I A_{n,m}(n/n+1); D_{n,m} = -B_{n,m}(n/n+1) \quad (4)$$

A second boundary condition, namely, that the current density at the surface of the sphere is equal to the change in tangential magnetic field $B$ between inside and outside of the sphere, is expressed as follows:

$$\mu_o J_\theta = B_{i\phi} - B_{o\phi} \quad (5)$$

$$\mu_o J_\phi = -(B_{i\theta} - B_{o\theta}) \quad (6)$$

where: $\mu_o$ is the permeability of free space, $J_\theta$ is the longitudinal current density in the surface of the sphere of radius $a$, $J_\phi$ is the current density in the azimuthal direction at the surface of the sphere, $B_{i\phi}$ is the azimuthal magnetic field just inside the sphere, $B_{o\phi}$ is the azimuthal magnetic field just outside the sphere, $B_{i\phi}$ is the magnetic field just inside the sphere in the longitudinal direction, and $B_{o\theta}$ is the magnetic field intensity just outside the sphere in the longitudinal direction.

Taking the first derivatives of equations (2) and (3), satisfying the boundary conditions of equations (5) and (6) and solving for the current densities on the surface of the sphere at radius $a$, we obtain the following general solutions:

$$\mu_o J_\theta = \frac{m}{a \sin \theta} \frac{(2n+1)}{(n+1)} P_{n,m}(A_{n,m} \sin m\phi - B_{n,m} \cos m\phi) \quad (7)$$

$$\mu_o J_\phi = \frac{1}{a} \frac{(2n+1)}{(n+1)} \frac{\gamma P_{n,m}}{\gamma \theta}(A_{n,m} \cos m\phi + B_{n,m} \sin m\phi) \quad (8)$$

Substituting into equations (7) and (8) the Legendre Polynomial of the second degree and zero order, we obtain equations for the current distribution on the surface of the sphere as follows:

$$a\mu_o J_\theta = 0 \quad (9)$$

$$a\mu_o J_\phi = (-5/2) A_{2,o} \sin 2\theta \quad (10)$$

From the current distribution equations (9) and (10) it can be seen that only azimuthal currents are present and that the current density in the azimuthal direction is maximum at latitudes corresponding to $\theta = 45°$. The surface currents defined by equations (9) and (10) have been depicted in FIG. 2.

The linear magnetic field gradients at the center of the sphere eliminated by the current distribution depicted in FIG. 2 can be found by substituting $n=2$, $m=o$ and $r=o$ into equation (2) and taking the second derivative thereof. The current distribution of FIG. 2 controls linear gradients as follows:

$$2(\delta H_z/\delta z) - (\delta H_x/\delta x) - (\delta H_y/\delta y) \quad (11)$$

It has been found that the current distribution depicted in FIG. 2 can be approximated to a very good degree by a pair of mutually opposed bucking coils 1' (FIG. 3) disposed on the outside of the sphere and having the axis of the coil pair in alignment with the $z$ axis. Currents are passed through the coils 1' in the directions as shown.

FIG. 3A depicts a set of coils 1'' as they are wound on the surface of a cube for eliminating substantially the same gradients, equation (11), removed by the coils 1' of FIG. 3.

Referring now to FIG. 4 and solving the current distribution equations (7) and (8) for $n=2$ and $m=1$ there are found to be two solutions, one corresponding to the A coefficient terms and the other solution corresponding to the B coefficient terms. The A coefficient current distribution solution is as follows:

$$a\mu_o J_\theta = 5 A_{2,1} \cos \theta \sin \Phi \quad (12)$$

$$a\mu_o J_\phi = 5 A_{2,1} \cos 2\theta \cos \Phi \quad (13)$$

The current distribution on the surface of the sphere corresponding to the $A_{2,1}$ solution is depicted in FIG. 4. This current distribution can be approximated by a set of four coils 2', each coil having substantially equal ampere turns as shown in FIG. 4.

FIG. 4A shows a coil set 2'' wound on the surface of a cube to remove substantially the same gradients removed by the current distribution of FIG. 4. The linear magnetic field gradients removed by the coil sets 2' and 2'' of FIGS. 4 and 4A are as follows:

$$(\delta H_z/\delta x) = (\delta H_x/\delta z) \quad (14)$$

The independent coil sets 2' and 2'' described in FIGS. 4 and 4A comprise two pairs of quadraturely placed bucking coils, the axes of said bucking coil pairs lying approximately on lines described by the relationship $z=-x$, $y=o$; and $z=x$, $y=o$.

Referring now to FIG. 5 there is shown the current distribution corresponding to the solution of the surface currents for $n=2$, $m=1$ using the 2,1 coefficient. These currents are described by the following relationships:

$$a\mu_o J_\theta = 5 - B_{2,1} \cos \theta \cos \Phi \quad (15)$$

$$a\mu_o J_\phi = 5 B_{2,1} \cos 2\theta \sin \Phi \quad (16)$$

The current distribution described by the above equations (15) and (16) is indicated in FIG. 5 and is approximated by four coils 3' quadraturely spaced, preferably, series-connected and wound on the outside surface of the sphere.

FIG. 5A shows an equivalent set of independent coils 3'' wound on a cube for cancelling the same magnetic field gradients canceled by the coils of FIG. 5. The independent coil sets described in FIGS. 5 and 5A remove the following magnetic field gradients:

$$(\delta H_z/\delta y) = (\delta H_y/\delta z) \quad (17)$$

The independent coil sets 3' and 3'' comprises four individual coils series-connected as bucking pairs and disposed straddling the volume of field it is desired to correct. The two coil pairs have their respective axes substantially in alignment with lines described by $y=z$, $x=o$; and $y=-z$, $x=o$, and are disposed substantially at an angle of 60° to the axes of coil sets 2' and 2'' respectively.

Referring now to FIG. 6, there is shown the current distribution on the surface of the sphere corresponding to the solution of equations (7) and (8) where $n=2$, $m=2$. Again there are two solutions, one for the A coefficient and one for the B coefficient. The current distribution for the A coefficient is defined by the following relationships:

$$a\mu_o J_\theta = 10 A_{2,2} \sin \theta (\sin 2 \Phi) \quad (18)$$

$$a\mu_o J_\phi = 5 A_{2,2} \sin 2 \theta (\cos 2 \Phi) \quad (19)$$

This current distribution is shown in FIG. 6 and is approximated by a set of independent coil pairs 4' series-connected and bucking wound on the surface of the sphere. The two coil pairs have their axes in substantial alignment with the $x$ and $y$ axes respectively.

FIG. 6A shows the independent set of two coil pairs 4" as they are wound on the surface of a cube. The independent coil sets 4' and 4" of FIGS. 6 and 6A serve to remove the following gradients:

$$-(\delta H_x/\delta x)+(\delta H_y/\delta y) \quad (20)$$

Referring now to FIG. 7 there is shown the current distribution on the surface of a sphere corresponding to the $B_{2,2}$ coefficient solution of equations (7) and (8) for $n=2$, $m=2$. This current distribution is described by the following relationships:

$$a\mu_o J_\theta = -10 B_{2,2} \sin \theta \cos 2\Phi \quad (21)$$
$$a\mu_o J_\phi = 5 B_{2,2} \sin 2\theta \sin 2\Phi \quad (22)$$

The current distribution described by the relationships (21) and (22) can be approximated by an independent set of two pairs of mutually opposed series-connected bucking coils 5' having their axes aligned substantially on lines defined by $x=y$, $z=0$; and $x=-y$, $z=0$. The current distribution of FIG. 7 serves to operate upon the following gradients:

$$(\delta H_x/\delta y)=(\delta H_y/\delta x) \quad (23)$$

FIG. 7A shows the independent set of two pairs of mutually opposed bucking coils 5" described in FIG. 7 as wound on the surface of a cube. The coil configuration of FIG. 7A operates upon the same gradients as the configuration described in FIG. 7.

The linear magnetic field gradients are interrelated in the following way:

$$(\delta H_x/\delta x)+(\delta H_y/\delta y)+(\delta H_z/\delta z)=0 \quad (24)$$

The above-described five independent sets of coils shown in FIGS. 3—7A are preferably connected as shown in FIG. 1. By variably adjusting the currents through the independent coil sets of optimum adjustment of each in the well-known manner as described by F. A. Nelson, U.S. Pat. No. 2,858,504, issued Oct. 28, 1958 all of the first order gradients in the center of the space surrounded by the coils may be removed thereby greatly enhancing the homogeneity of the magnetic field. These independent coil sets are especially useful in the gyromagnetic resonance spectrometer art as they will remove the objectionable first order gradients which tend to broaden the resonance line, thus having a deleterious effect upon the resolution obtainable from a given sample of gyromagnetic material. These independent coil sets are also extremely useful for improving the homogeneity of the magnetic field over a sample of gyromagnetic material utilizes for sensing the magnitude of a certain magnetic field as, for example, the earth's field. The coils have been shown as preferably consisting of a single turn, however, they may comprise more than one turn and need not be coils per second but may well be constituted from more than one conductor or portion of conductors, the conductors or portions of conductors being arranged to produce current loops approximately as indicated by the coils.

Referring now to FIG. 8 there is shown a schematic circuit diagram of seven sets of independent coils utilized for removing all second order gradients from the magnetic field at the center of the space surrounded by the sets of coils. More specifically, coils 21—27 represent the individual independent coil sets, hereinafter described in greater detail. By selecting the proper current through the individual coil sets, substantially all the second order gradients of the magnetic field surrounded by said coils 21—27 may be eliminated in the manner as aforementioned.

The coil sets are energized by independently variable currents derived from batteries 28 and 29 connected to make one end of each of respective resistors 31—37 positive and to make the other end of the respective resistors 31—37 negative with respect to ground. One end of each of the coil sets 21—27 is grounded such that by varying the position of the pickoffs 38 on the resistors 31—37, the currents through the coil sets 21—27 may be independently varied in amount and sense as desired.

Referring now to FIG. 9 it has been found that certain of the second order gradients are removed by currents $j$ defined by solutions of equations (7) and (8) using Legendre Polynomials of the third degree, and zero order. The current distributions resulting on the surface of a sphere of radius $a$ are expressed by the following relations:

$$a\mu_o J_\theta = 0 \quad (25)$$
$$a\mu_o J_\phi = (21/8) A_{3,0} \sin \theta (1-5 \cos^2 \theta) \quad (26)$$

From the current distribution equations (25) and (26), it can be seen that only azimuthal currents are present and that the current density in the azimuthal direction is maximum at latitudes corresponding to $\theta=31°$, 90° and 149°. The surface currents $j$ defined by equations (25) and (26) have been depicted in FIG. 9.

It has been found that the current distribution depicted in FIG. 9 can be approximated to a very good degree by a coaxial coil set 21' of three coils disposed on the outside of the sphere and having the axis of the coil set 21' in alignment with the Z axis. Currents are passed through the coil set 21' as depicted in FIG. 9.

The ampere turn of the coils disposed at latitudes of 31° and 149° are of equal magnitude and the ampere turns of the coil at the latitude of 90° is only 0.728 of the ampere turns of each of the other coils.

FIG. 9A depicts an independent coil set 21" which is equivalent to the previously described coil set 21' shown in FIG. 9. Coils 21" are shown as they are wound on the surface of a cube for eliminating certain undesired magnetic field gradients at the center thereof. The coils of FIGS. 9 and 9A can be defined as three coils mutually spaced apart having a common axis in approximate alignment with the Z axis. The proper ratios of ampere turns of the coils at different latitudes may be readily obtained by insertion of resistors 40 and 41. The ratio of these resistances being inversely proportional to the ratio of the desired ampere turns through the respective branches. As an alternative, the turns of the coils may be proportioned directly to the ratio of ampere turns to give the same result with a series connection of the coils.

Referring now to FIG. 10 and solving the current distribution equations (7) and (8) for $n=3$, $m=1$, there are found to be two solutions, one corresponding to the $A_{3,1}$ coefficient terms and the other corresponding to the $B_{3,1}$ coefficient terms. The $A_{3,1}$ coefficient current distribution solution is as follows:

$$a\mu_o J_\theta = (21/8) A_{3,1} (5 \cos^2 \theta - 1) \sin \Phi \quad (27)$$
$$a\mu_o J_\phi = (21/8) A_{3,1} \cos \theta (4-15 \sin^2 \theta) \cos \Phi \quad (28)$$

The current distribution on the surface of the sphere corresponding to the $A_{3,1}$ solution is depicted in FIG. 10. This current distribution can be approximated by a set of three coil pairs 22' having the proper magnitude of current run therethrough as more fully described below.

FIG. 10A shows a coil set 22" wound on the surface of a cube to remove substantially the same second order gradients removed by the current distribution of FIG. 10. The independent coil sets 22' and 22" described in FIGS. 10 and 10A comprise three pairs of approximately 60° spaced additive coils where additive means that the magnetic field produced by each half of the coil pair has the same sense in the spaces between the coils. The axes of said additive coil pairs lie substantially on lines described by the relationships:

$$Y=0, Z=0; Y=0, Z=\pm\frac{\sqrt{11}}{2}X$$

The ampere turns of the coil pair centered on the X axes exceeds the ampere turns of the coil pairs centered on $$Y=0, Z=\pm\frac{\sqrt{11}}{2}X$$

by the factor of 1.21. This ampere turns ratio is preferably determined by the ratio of resistances of resistors 42 and 43 (see FIG. 8).

Referring now to FIG. 11 there is shown the current distribution corresponding to the solution of the surface currents for $n=3$, $m=1$ using the $B_{3,1}$ coefficient. These currents are described by the following relationships:

$$a\mu_o J_\theta = (-21/8) B_{3,1} (5 \cos^2 \theta - 1) \cos \Phi \quad (29)$$
$$a\mu_o J_\phi = (-21/8) B_{3,1} \cos \theta (4-15 \sin^2 \theta) \sin \Phi \quad (30)$$

The current distribution described by the above equations (29) and (30) is indicated in FIG. 11 and is approximated by a coil set 23' comprises of six coils connected and wound on the outside of the sphere, as shown.

FIG. 11A shows an independent coil set 23" which is equivalent to the coil set 23'. Coil set 23" is shown as it is wound on a cube for cancelling the same second order magnetic field gradients canceled by the coil set 23' of FIG. 11.

Independent coil sets 23' and 23" comprise six individual coils connected as coaxial additive pairs and disposed straddling the volume of field it is desired to correct. The three coil pairs have their respective axes substantially in alignment with lines described by:

$$x=0, z=0; x=0, z=\pm\frac{\sqrt{11}}{2}y$$

The current through the coil pair centered on the Y axes exceeds the current through the other coil pairs by the factor 1.21. The proper current ratio is preferably determined by the proper proportioning of the resistances of resistors 44 and 45 respectively.

Referring now to FIG. 12 there is shown the current distribution on the surface of the sphere corresponding to the solution of equations (7) and (8) where $n=3$, $m=2$. Again there are two solutions, one for the $A_{3,2}$ coefficient and one for the $B_{3,2}$ coefficient. The current distribution for the $A_{3,2}$ coefficient is defined by the following relationships:

$$a\mu_o J_\theta=(105/4) A_{3,2} \sin 2\theta \sin 2\Phi \quad (31)$$
$$a\mu_o J_\phi=(-105/4) A_{3,2} \sin \theta (1-3\cos^2\theta) \cos 2\Phi \quad (32)$$

This current distribution is shown in FIG. 12 and is approximated by coil set 24' of four coil pairs series-connected and additive wound on the surface of the sphere. The coil pairs have their axes in substantially alignment with axes defined by $x=\pm Y Z=Y$; and $Z=-Y$, $x=\pm Y$, which axes intersect each other at approximately 70° angles.

FIG. 12A shows the independent coil set 24" of four coil pairs as they are wound on the surface of a cube. The independent coil sets 24' and 24" of FIGS. 12 and 12A serve to remove certain undesired second order gradients.

Referring now to FIG. 13 there is shown the current distribution on the surface of the sphere corresponding to the $B_{3,2}$ coefficient solution of equations (7) and (8) for $n=3$, $m=2$. This current distribution is described by the following relationships:

$$a\mu_o J_\theta=(-105/8) B_{3,2} \sin 2\theta \cos 2\Phi \quad (33)$$
$$a\mu_o J_\phi=(-105/4) B_{3,2} \sin \theta (1-3\cos^2\theta) \sin 2\Phi \quad (34)$$

The current distribution described by the relationships (33) and (34) can be approximated by an independent coil set 25' of four pairs of mutually opposed series-connected additive coils having their axes aligned substantially on lines defined by:

$$Y=0, Z=\pm\frac{x}{\sqrt{2}}; x=0, Z=\pm\frac{Y}{\sqrt{2}}$$

which axes intersect each other at 70° angles and intersect the axes of the coils of 24' and 24" at approximately 35° angles. The current distribution of FIG. 13 serves to operate upon and remove certain undesired second order magnetic field gradients.

FIG. 13A shows the independent coil set 25" of four pairs of mutually opposed additive coils as wound on the surface of a cube. The coil configuration of FIG. 13A operates upon the same gradients as the configuration described in FIG. 13.

Referring now to FIG. 14 there is shown the current distribution corresponding to the solution of the surface currents for $n=3$, $m=3$. Again there are two solutions, one corresponding to the $A_{3,3}$ coefficient terms and the other corresponding to the $B_{3,3}$ coefficient terms. The $A_{3,3}$ coefficient current distribution solutions are as follows:

$$a\mu_o J_\theta=(315/4) A_{3,3} \sin^2\theta \sin 3/\Phi \quad (35)$$
$$a\mu_o J_\phi=(315/4) A_{3,3} \sin^2\theta \cos \theta \cos 3\Phi \quad (36)$$

The current distribution on the surface of a sphere corresponding to the $A_{3,3}$ solution is depicted in FIG. 14. This current distribution can be approximated by an independent coil set 26' of three pairs of coils having substantially equal currents run therethrough as shown in FIG. 14.

FIG. 14A shows the independent coil set 26" as wound on the surface of a cube to remove substantially the same gradients removed by the current distribution of FIG. 14.

Independent coil sets 26' and 26" described in FIGS. 14 and 14A comprise three pairs of 60° spaced additive coils, the axes of said additive coil pairs lying substantially on lines described by the relationships $y=0$, $Z=0$; $Z=0$, $y=\sqrt{3}x$; and $y=-\sqrt{3}x$, $Z=0$.

Referring now to FIG. 15 there is shown the current distribution corresponding to a solution of the surface currents for $n=3$, $m=3$ using the $B_{3,3}$ coefficient. These currents are described by the following relationships:

$$a\mu_o J_\theta=(-315/4) B_{3,3} \sin^2\theta \cos 3\Phi \quad (37)$$
$$a\mu_o J_\phi=(315/4B_{3,3}) \sin^2\theta \cos \theta \sin 3\Phi \quad (38)$$

The current distribution described by the above equations (37) and (38) is indicated in FIG. 15 and is approximated by a coil set 27' comprised of six coils series connected and additive wound on the outside surface of the sphere, as shown.

FIG. 15A shows an equivalent independent coil set 27" wound on a cube for cancelling the same magnetic field gradients canceled by the independent coil sets 27' of FIG. 15.

Independent coil sets 27' and 27" comprise six individual coils series connected as additive pairs and disposed straddling the volume in which field correct ion is desired. The three coil pairs have their respective axes substantially in alignment with lines described by: the y axis; $x=-\sqrt{3}y$, $Z=0$; $x=\sqrt{3}y$, $Z=0$.

The above-described seven independent sets of coils shown in FIGS. 9—15A are preferably connected as shown in FIG. 8. By variably adjusting the current through the independent coil sets, all of the second order gradients in the center of the space surrounded by the coils may be removed thereby greatly enhancing the homogeneity of the magnetic field.

In the preceding description several conductor patterns have been set forth for producing the respective desired independent sets of current loop patterns. It is readily apparent that numerous other conductor patterns may be employed for obtaining the respective independent current loop patterns as taught herein.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:

1. Apparatus for improving the homogeneity of a certain volume of magnetic field by removing certain undesired second order magnetic field gradients including, means for providing three spaced-apart current loops, each of said current loops being substantially coaxially disposed, a first of said current loops being disposed enveloping centrally the certain volume of magnetic field, said second and third current loops being bucking-connected with respect to said first current loop and disposed straddling the certain volume of magnetic field, said second and third current loops adapted to have substantially equal turns, and said first current loop adapted to have approximately 0.7 times the turns of each of said second and third coils.

2. The apparatus according to claim 1 including means for energizing said first, second and third current loops, and said second and third current loops adapted to have substantially equal ampere turns when energized, and said first current loop adapted to have substantially 0.7 times the ampere turns of each of said second and third current loops when energized.

3. Apparatus for improving the homogeneity of a certain volume of magnetic field by removing certain undesired second order magnetic field gradients including, means for providing a first three pairs of additive connected current loops, each of said current loop pairs disposed straddling the certain volume of magnetic field and defining a loop pair axis by a straight line interconnecting the geometric centers of both of said current loops, and the axis of said current loop pairs being angularly spaced approximately 60° apart from each other, and one of said current loop pairs adapted to have approximately 1.2 times the turns of each of the other two current loop pairs.

4. The apparatus according to claim 3 including means for energizing said current loop pairs, and one of said current loop pairs adapted to have approximately 1.2 times the ampere turns of each of the other two current loop pairs when energized.

5. Apparatus for improving the homogeneity of a certain volume of magnetic field by removing certain undesired second order magnetic field gradients including, means for providing three pairs of additive connected current loops, each of said pairs of current loops being approximately coaxially disposed and defining a loop pair axis by a straight line interconnecting the geometric centers of both of said current loops, and the axes of said current loop pairs being angularly spaced approximately 60° apart from each other, each of said current loop pairs disposed straddling the certain volume of magnetic field.

6. The apparatus according to claim 5 including means for energizing said three pairs of current loops, and all of said three pairs of current loops adapted to have substantially equal ampere turns when energized.

7. Apparatus for improving the homogeneity of a certain volume of magnetic field by removing certain undesired second order magnetic field gradients including, means for providing a first four pairs of coaxial current loop pairs, each of said four current loop pairs disposed straddling the certain volume of magnetic field and defining a loop pair axis by a straight line interconnecting the geometric centers of both of said current loops, and the axes of said current loop pairs being angularly spaced approximately 70° apart from each other.

8. The apparatus according to claim 4 including means for energizing said four current loop pairs, and all of said four current loop pairs adapted to have substantially equal ampere turns when energized.

9. The apparatus according to claim 7 including, means for providing a second four pairs of spaced aiding-connected current loops, each of said second four pairs of current loops disposed straddling the certain volume of magnetic field and defining a loop pair axis by a straight line interconnecting the geometric centers of both of said current loops, and the axes of said second current loop pairs being angularly spaced approximately 70° apart from each other, and the axes of said second four pairs of current loops disposed approximately 35° to the axes of said first four pairs of current loops.

10. The apparatus according to claim 9 including means for energizing said second four current loop pairs, and all of said second four current loop pairs adapted to have substantially equal ampere turns when energized.